United States Patent Office 2,861,933
Patented Nov. 25, 1958

2,861,933

PHOTOPOLYMERIZATION

Roland J. Kern, Dayton, Ohio, assignor to Monsanto Chemical Company, St. Louis, Mo., a corporation of Delaware No Drawing. Application July 1, 1953
Serial No. 368,538

12 Claims. (Cl. 204—158)

This invention relates to photopolymerization of unsaturated organic compounds. In specific aspects the invention pertains to new photosensitizers for the photopolymerization of acrylonitrile, methacrylonitrile, styrene and the lower alkyl acrylates and methacrylates.

The essence of this invention resides in the use of thiuram monosulfides as sensitizers for photopolymerization. In accordance with preferred aspects of the invention one or more of the monomers acrylonitrile, methacrylonitrile, styrene and the lower alkyl acrylates and methacrylates, is subjected to the polymerizing influence of light in the ultraviolet range while having dispersed in said monomer a small amount of a thiuram monosulfide effective to photosensitize, i. e. speed up, the polymerization. The thiuram monosulfides employed according to the invention act to increase the rate of polymerization occurring under the influence of light in the ultraviolet range, and can be termed photosensitizers or photopolymerization catalysts. Preferably light containing effective amounts of light having wave lengths of 2,000 to 4,000 Angstrom (A.) units is used.

Preferred photosensitizers of the present invention can be represented by the structural formula:

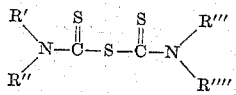

wherein R is alkyl or two R's attached to a single nitrogen taken together consist of a pentamethylene group forming with the N a piperidinium group. The same thing can be expressed by stating that R is selected from the group consisting of alkyl and pentamethylene, the latter formed from two R's taken together and attached to a single nitrogen to form a piperidinium group. While the foregoing are preferred, the invention in its broader aspects includes the use of any thiuram monosulfide effective to increase the rate of photopolymerization of a monomer. Thus, it will be apparent that compounds of the structural formula as defined and related compounds wherein one or more of the R's is substituted by a non-interfering group, i. e. a group which does not prevent the desired initiation of photopolymerization, can be employed. Among groups that are usually non-interfering can be mentioned by way of example: halogen, aryl, cycloalkyl, alkoxy. Likewise where two R's and the nitrogen to which they are attached taken together form a piperidinium group the same can be substituted with non-interfering groups, including those mentioned above and others, e. g. alkyl. Where any R is alkyl it can have a straight chain or a branched chain configuration; preferred alkyl groups contain from 1 to 6 carbon atoms. It will be apparent that in a given thiuram monosulfide all R's can be the same or different R's can exist in the same compound. However, because of convenience in synthesis, ordinarily all R's will be the same. As specific examples of constituents that are normally non-interfering and that can be substituted on the R's of a thiuram monosulfide of the structural formula given can be mentioned methyl, isobutyl, chloro, bromo cyclohexyl, methylcyclopentyl, butoxy, naphthyl, benzyl, phenyl, tolyl. Among the numerous thiuram monosulfides, the following are mentioned by way of example and not limitation:

N,N'-dipentamethylenethiuram monosulfide
Tetramethylthiuram monosulfide (known commercially as "Monothiurad")
Tetraethylthiuram monosulfide (this compound can also be named bis-(diethylthiocarbamyl)sulfide)
Tetraisopropylthiuram monosulfide
Bis-[di-(β-chloroethyl)thiocarbamyl]sulfide
Bis-[n-(butylmethyl)thiocarbamyl]sulfide The quantity of thiuram monosulfide to be used as photosensitizer will of course be dependent upon many variables including the particular thiuram monosulfide, the wave length of ultraviolet light employed, the intensity of the light employed, the time of irradiation, the monomer or monomers present, and the temperature. In any event, the amount of thiuram monosulfide photosensitizer is small, but sufficient is employed to be effective as a photosensitizer. This small but catalytic amount is usually within the range of from 0.01 to 5 weight percent based upon the amount of monomeric material initially present. It will seldom be necessary to employ more than 1 or 2 weight percent of the added photosensitizer, and no more than 0.1 weight percent is in most instances sufficient to obtain a good polymerization rate.

Conditions of temperature and pressure at which the photopolymerization is effected can be varied over a wide range. It will be understood that optimum conditions will be greatly dependent upon the particular monomeric material being polymerized. Many photopolymerizations are readily effected at temperatures of from 0° C. to 150° C. when the monomer is exposed to a light source rich in ultraviolet light. The present knowledge of the art on photopolymerizations is sufficient to permit choice of suitable operating conditions for any particular monomer, and simple tests can be run if necessary to determine the conditions most suitable for any particular system. At a given temperature, the practice of my invention makes possible a more rapid photopolymerization than is effected in the absence of my added photosensitizer.

Any suitable source of radiation providing wave lengths in the ultraviolet range, preferably within the range of 2,000 to 5,000 Angstrom units and still more preferably within the range of 2,000 to 4,000 Angstroms, can be used. Common sources include mercury lamps and arcs, carbon arcs and hydrogen discharge tubes. Of course, sunlight also contains substantial amounts of ultraviolet radiation and can be used if desired. Radiation of sufficient intensity from tungsten lamps can be employed. In any event, light within the ultraviolet range of sufficient intensity and for a sufficient time is used to effect the desired extent of polymerization, which can be very small, for example 1 percent of the monomer polymerized but which, for practical reasons, should be considerably larger.

The vessel in which the polymerization is conducted should be transparent to light of the desired wave length so that the light can pass through the sides of the container. Suitable glasses are available commercially, and include borosilicate ("Pyrex"), "Vycor," or soft glass. Alternatively, the source of light can be placed directly over the surface of the monomer in a container, or can be placed within the reaction mixture itself.

While the photopolymerization is usually conducted in mass, i. e. in a system wherein the only components of the reaction mixture are the monomer (or monomers)

plus the thiuram monosulfide photoinitiator (together with other polymerization initiators and catalysts if desired), the invention is more broadly applicable to all types of polymerization techniques. For example, an added organic solvent for monomer and/or polymer can be present, such as benzene, aliphatic hydrocarbons, ethanol, methanol. Further, the polymerization can be effected by the well-known suspension and emulsion techniques. In the former the monomeric material, preferably already containing the thiuram monosulfide compound chosen as photosensitizer, is suspended in the form of small particles in a non-solvent liquid, such as water, an added suspending agent such as starch, carboxymethylcellulose, phosphates, vinyl acetate-maleic anhydride copolymer, or the like being present to aid in maintaining the particles separate one from another; during the polymerization the particles tend to grow in size. Emulsion polymerization is similar with the exception that added emulsifying agents are used and the particle size is much smaller so that a stable aqueous emulsion of polymer is the end product of the polymerization. In this instance also it is preferred to dissolve the thiuram monosulfide catalyst in the monomeric material prior to emulsifying the same. Suitable emulsifying agents are sodium or potassium fatty acid soaps, sodium alkaryl sulfonates, and non-ionic emulsifiers such as condensation products of ethylene oxide with tertiary-alkyl mercaptans. It is generally preferred that free oxygen be absent during the polymerization.

In view of my discovery of the photosensitizing action of thiuram monosulfides in photopolymerization of a variety of unsaturated organic compounds, it will be apparent that the invention covers broadly the use of any thiuram monosulfide effective to accelerate the polymerization of any monomeric material. There will, of course, be monomers and thiuram monosulfides that are not effective, but those skilled in the art, having had the benefit of the present disclosure, can readily determine by obvious simple tests suitable monomers and thiuram monosulfides to be employed. It can be pointed out by way of example that the photopolymerization of vinyl acetate is not accelerated by thiuram monosulfides. The preferred monomers are acrylonitrile, methacrylonitrile, styrene, and the lower alkyl acrylates and methacrylates. By the term "lower alkyl acrylates and methacrylates," I include for example methyl, ethyl, isopropyl, n-propyl, n-butyl, sec.-butyl, tert.-butyl, and the various amyl and hexyl acrylates and the same methacrylates in particular. However, other lower alkyl acrylates and methacrylates containing a greater number of carbon atoms, for example up to 8 or 10 carbon atoms, in the alkyl group, fall within the broad scope of the invention.

The monomeric material can be any monomeric material whose photopolymerization is accelerated by a thiuram monosulfide. The monomeric material can be a single monomer or a mixture of monomers. Thus, the monomeric material preferably is one of the monomers specifically mentioned hereinabove or a mixture of monomers containing one or more of said monomers specifically mentioned hereinabove. Thus, the monomeric material can consist of a single monomer, e. g., styrene, or methyl methacrylate, in which case a homopolymer is formed. Or, a copolymer can be formed by subjecting to photopolymerization a mixture of monomers, e. g., styrene plus methyl methacrylate or styrene plus some other ethylenically unsaturated monomer copolymerizable therewith.

The purity of monomer may have a marked effect upon the polymerization rate. Thus, it is ordinarily preferred that the polymerization be effected with freshly distilled monomer, and also in the absence of air. Various thiuram monosulfides will differ in the extent to which they are affected by monomer purity, choice of monomer, and conditions of reaction. The invention encompasses the use of those thiuram monosulfides effective to photosensitize, i. e. increase the rate of the polymerization of a given monomeric material of the class described herein under the influence of light in the ultraviolet range with a suitable combination of reaction conditions, including monomer purity and quantity of thiuram monosulfide.

The following examples illustrate some preferred aspects of the invention but are not to be taken as exhaustive of the broad scope thereof.

EXAMPLES

Photopolymerization tests were made by sealing under nitrogen in a "Pyrex" glass tube 20 ml. of the chosen monomer, together with 0.02 gram of tetramethylthiuram monosulfide. With each monomer a blank was run in which the same quantity of monomer was sealed in the tube without any added tetramethylthiuram monosulfide. The tubes were equally irradiated by a General Electric B-H-4 ultraviolet lamp (a mercury vapor bulb giving light rich in the ultraviolet range) at a distance of 1 to 2 inches, the tubes being held at 40° C. to 45° C. during irradiation. The irradiation time was varied with the different monomers in accordance with previous experience indicating a desirable time for tests of this nature.

After the given polymerization period each tube was opened, the weighted contents precipitated in excess methanol, filtered, washed with methanol, dried and weighed again to determine the amount of polymer formed, whereby the weight percent of monomer charged that had been converted to polymer was obtained.

Example 1

Methyl methacrylate was subjected to photopolymerization in the manner described above for a period of 3 hours. At the end of this time the blank (tube containing nothing but methyl methacrylate sealed under nitrogen) yielded 3 weight percent polymer, i. e. 3 weight percent of the methyl methacrylate initially charged had been converted to polymer. On the other hand, the tube containing the tetramethylthiuram monosulfide yielded 68 weight percent polymer.

Example 2

Acrylonitrile was photopolymerized as described above for a period of 3 hours. The blank yielded zero (0) percent polymer. The sample containing tetramethylthiuram monosulfide yielded 6 weight percent polymer.

Example 3

Styrene was subjected to photopolymerization as described above for a period of 20 hours. The blank yielded 10 weight percent polymer. The sample containing tetramethylthiuram monosulfide yielded 30 weight percent polymer.

Example 4

Methacrylonitrile was subjected to photopolymerization as described above for a period of 16 hours. At the end of this period of time a small quantity of polymer had formed and settled to the bottom to a depth of approximately 1/8 inch in the blank. A similar result had occurred in the sample containing the tetramethylthiuram monosulfide but the quantity of polymer was more than twice as great.

Example 5

An attempt was made to photopolymerize vinyl acetate in the manner described above, employing a period of 24 hours. Both the blank and the sample containing the tetramethylthiuram monosulfide resulted in zero (0) percent conversion.

Example 6

Methyl acrylate was subjected to photopolymerization in the manner described above for a period of 3 hours. The blank yielded zero (0) percent polymer. A conversion of 90 weight percent of the starting monomer to polymer was obtained with the sample containing the tetramethylthiuram monosulfide.

While the invention has been described with particular reference to various preferred embodiments thereof, it will be appreciated that numerous modifications and variations are possible without departing from the invention.

I claim:

1. In the photopolymerization of a monomer selected from the group consisting of acrylonitrile and methacrylonitrile, the improvement which comprises conducting said photopolymerization in the presence of a small amount of a photosensitizer consisting essentially of a thiuram monosulfide effective to photosensitize said polymerization.

2. A process which comprises polymerizing under the influence of light in the ultraviolet range a monomer selected from the group consisting of acrylonitrile and methacrylonitrile, in the presence of a small amount of a photosensitizer consisting essentially of a thiuram monosulfide compound effective to photosensitize said polymerization.

3. A process according to claim 2 wherein said compound is employed in an amount within the range of from 0.01 to 1.0 weight percent of the monomer.

4. A process which comprises polymerizing under the influence of light in the ultraviolet range a monomer selected from the group consisting of acrylonitrile and methacrylonitrile, in the presence of small but catalytic amounts of a photosensitizer consisting essentially of tetramethylthiuram monosulfide.

5. A process which comprises polymerizing under the influence of light in the ultraviolet range a monomer selected from the group consisting of acrylonitrile and methacrylonitrile, in the presence of small but catalytic amounts of a photosensitizer consisting essentially of N,N'-dipentamethylenethiuram monosulfide.

6. A process which comprises polymerizing under the influence of light in the ultraviolet range a monomer selected from the group consisting of acrylonitrile and methacrylonitrile, in the presence of small but catalytic amounts of a photosensitizer consisting essentially of a compound having the structural formula:

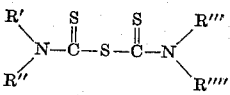

wherein R is selected from the group consisting of alkyl and pentamethylene, the latter formed from two R's taken together and attached to a single nitrogen to form a piperidinium group.

7. A process according to claim 6 wherein said monomer is acrylonitrile.

8. A process according to claim 6 wherein said monomer is methacrylonitrile.

9. A process which comprises admixing with a monomeric material comprising a monomer selected from the group consisting of acrylonitrile and methacrylonitrile a small but effective amount less than 1 weight percent of a photosensitizer consisting essentially of a thiuram monosulfide compound effective as photosensitizer, and subjecting the resulting admixture to the photopolymerizing effect of radiation within the range of from 2,000 to 4,000 Angstrom units of sufficient intensity for a sufficient time to polymerize at least a portion of said monomeric material.

10. A process according to claim 1 wherein said thiuram monosulfide is tetramethylthiuram monosulfide.

11. A process according to claim 4 wherein said monomer is acrylonitrile.

12. A process according to claim 4 wherein said monomer is methacrylonitrile.

References Cited in the file of this patent

UNITED STATES PATENTS

| 2,383,319 | Kharasch | Aug. 21, 1945 |
| 2,423,520 | Richards | July 8, 1947 |
| 2,460,105 | Richards | Jan. 25, 1949 |

FOREIGN PATENTS

| 654,026 | Great Britain | May 30, 1951 |